United States Patent [19]

Limberg

[11] Patent Number: 5,852,476
[45] Date of Patent: Dec. 22, 1998

[54] USING SPECIAL NTSC RECEIVER TO DETECT WHEN CO-CHANNEL INTERFERING NTSC SIGNAL ACCOMPANIES A DIGITAL TV SIGNAL

[75] Inventor: Allen LeRoy Limberg, Vienna, Va.

[73] Assignee: Samsung Electronics Co., Ltd., Suwon, Rep. of Korea

[21] Appl. No.: 882,540

[22] Filed: Jun. 25, 1997

Related U.S. Application Data

[63] Continuation-in-part of Ser. No. 821,944, Mar. 21, 1997.
[51] Int. Cl.[6] ................................................ H04N 5/44
[52] U.S. Cl. ...................... 348/725; 348/21; 348/558; 348/555
[58] Field of Search .................... 348/725, 726, 348/21, 607, 558, 553, 554, 555; 375/350, 346, 348, 349

[56] References Cited

U.S. PATENT DOCUMENTS

| | | | |
|---|---|---|---|
| 5,122,879 | 6/1992 | Ito ........................................... | 358/725 |
| 5,546,132 | 8/1996 | Kim et al. ............................... | 375/350 |
| 5,606,579 | 2/1997 | Pastel et al. ............................ | 375/350 |
| 5,646,698 | 7/1997 | Yang et al. .............................. | 348/725 |
| 5,715,012 | 2/1998 | Patel et al. .............................. | 348/558 |

*Primary Examiner*—Victor R. Kostak

[57] ABSTRACT

A method for detecting when a digital television signal is accompanied by co-channel interfering NTSC signal of substantial amplitude is described for use in a digital television receiver. The video portion of any co-channel interfering NTSC signal is synchrodyned to baseband, for generating an in-phase demodulation result including first artifacts of the digital television signal, and for generating a quadrature-phase demodulation result including second artifacts of the digital television signal. The quadrature-phase demodulation results are phase shifted by 90° at frequencies in a prescribed frequency range before being linearly combined with the in-phase quadrature-phase demodulation results, to generate a linear combining result substantially free of the first and second artifacts of the digital television signal in the prescribed frequency range. An indication that the digital television signal is accompanied by co-channel interfering NTSC signal of substantial amplitude is generated by detecting whenever the amplitude of the linear combining result exceeds a prescribed value.

8 Claims, 7 Drawing Sheets

USING SPECIAL NTSC RECEIVER TO DETECT WHEN CO-CHANNEL INTERFERING NTSC SIGNAL ACCOMPANIES A DIGITAL TV SIGNAL

This is a continuation-in-part of patent application Ser. No. 08/821,944 filed 21 Mar. 1997.

The invention relates to digital television as transmitted by radio waves in a broadcast television band and, more particularly, to a method for detecting in a digital television receiver when a digital television signal is accompanied by co-channel interfering NTSC signal of substantial amplitude.

BACKGROUND OF THE INVENTION

A Digital Television Standard published 16 Sep. 1995 by the Advanced Television Subcommittee (ATSC) specifies the nature of vestigial sideband (VSB) signals for transmitting digital television (DTV) signals in 6-MHz-bandwidth television channels such as those currently used in over-the-air broadcasting of National Television Subcommittee (NTSC) analog television signals within the United States. As long as NTSC analog television signals continue to be broadcast, it will be advantageous in a receiver for DTV signals to be able to determine when an NTSC analog television signal causes substantial co-channel interference with a DTV signal being received. The DTV receiver can then be designed to change its mode of operation responsive to a determination that such co-channel interference is occurring, so that the undesirable effects of such co-channel interference can be mitigated, which is usually done by comb filtering. The comb filtering employed in a DTV receiver for suppressing NTSC co-channel interference is better discontinued when such interference is not substantial, since this can avoid the additional Johnson noise arising from the plural paths through the comb filter. Generally, co-channel interference from an NTSC analog television signal is considered to be substantial if it has sufficient energy as to cause frequent errors in the data-slicing operations used during symbol decoding a DTV signal as synchrodyned to baseband. Parent patent application Ser. No. 08/821,944 filed 21 Mar. 1997 and entitled "USING VIDEO SIGNALS FROM AUXILIARY ANALOG TV RECEIVERS FOR DETECTING NTSC INTERFERENCE IN DIGITAL TV RECEIVERS" particularly describes a DTV receiver designed to change its mode of operation responsive to a determination that substantial co-channel interference is occurring, so that the undesirable effects of such co-channel interference can be mitigated. That application teaches that the detection of NTSC co-channel interference in digital TV receivers is more readily done after synchrodyning any such NTSC interference to baseband rather than after synchrodyning DTV signal to baseband.

U.S. Pat. No. 5,122,879 issued 16 Jun. 1992 to Katsu Ito and entitled "TELEVISION SYNCHRONOUS RECEIVER WITH PHASE SHIFTER FOR REDUCING INTERFERENCE FROM A LOWER ADJACENT CHANNEL" describes an analog television receiver that synchronously detects received NTSC signal both in-phase and quadrature-phase. The Ito receiver synchrodynes the radio-frequency (RF) amplifier response directly to baseband, so an adjacent lower channel may appear as an image. The quadrature-phase synchronous detection response is phase shifted 90° at all video frequencies above 500–750 kHz and linearly combined with the in-phase synchronous detection response to suppress image frequency components translated to baseband during synchronous detection of the received NTSC signal. In U.S. Pat. No. 5,122,879 Ito does not disclose the fact that this procedure also cancels the video components above 750 kHz. The attendant loss of luminance high frequencies is acceptable in small-viewing-screen television receivers, however, such as those used in wrist watches.

Current DTV receiver designs use plural frequency conversion, with a first conversion to an intermediate frequency in the ultrahigh frequency (UHF) band above the channels designated for television broadcasting, and with a second conversion to an intermediate frequency in the very high frequency (VHF) band below the channels designated for television broadcasting. So image suppression is not a problem. Furthermore, the carrier of a VSB DTV signal is located only 310 kHz from channel edge so there is very little double sideband content as compared to an NTSC signal.

The inventor points out that an NTSC receiver of the type linearly combining in-phase synchronous video detection response with inverse-Hilbert-transformed quadrature-phase synchronous video detection response is nevertheless of interest in DTV reception, for use as an auxiliary receiver for detecting when a digital television signal is accompanied by co-channel interfering NTSC signal of substantial amplitude. By arranging for the inverse Hilbert transformation of the quadrature-phase synchronous video detection response to frequencies well below 750 kHz, such an auxiliary receiver becomes substantially insensitive to artifacts of co-channel DTV signal. The suppression of the DTV artifacts simplifies measuring the magnitude of co-channel interfering NTSC signal.

SUMMARY OF THE INVENTION

The invention in one of its aspects is embodied in a method for detecting in a digital television receiver when a digital television signal is accompanied by co-channel interfering NTSC signal of substantial amplitude, which method comprises steps as follow. The video portion of any co-channel interfering NTSC signal is synchrodyned to baseband, for generating an in-phase demodulation result including first artifacts of the digital television signal, and for generating a quadrature-phase demodulation result including second artifacts of the digital television signal. The in-phase and quadrature-phase demodulation results are subsequently differentially shifted in respective phase by 90° at frequencies above a few kilohertz and then linearly combined to generate a linear combining result substantially free of the first and second artifacts of the digital television signal. Then, whether or not the amplitude of said linear combining result exceeds a prescribed value is detected, for generating an indication of when the digital television signal is accompanied by co-channel interfering NTSC signal of substantial amplitude.

The invention in another of its aspects is embodied in a digital television receiver including circuitry for detecting times when analog television signal of substantial amplitude occupies a television broadcast channel, which circuitry is more particularly described as follows. The receiver has input circuitry for selecting from a television broadcast channel a vestigial sideband amplitude-modulation signal descriptive of a video signal portion of any analog television signal that occupies the television broadcast channel, converting the selected vestigial sideband amplitude-modulation signal to an intermediate frequency signal, and amplifying the intermediate frequency signal to provide an amplified intermediate frequency signal. The vestigial sideband amplitude-modulation signal as originally received by the input circuitry includes a video carrier and full sideband in addition to a vestigial sideband. Video synchrodyning circuitry synchronously detects the amplified intermediate frequency signal with respect to the video carrier signal and with respect to a carrier in quadrature phase with the video carrier signal, for generating an in-phase synchronous detection response and for generating a quadrature-phase synchronous detection response. Phase shift circuitry referred to as an inverse Hilbert transform circuitry in this specification phase shifts by substantially 90° all frequency components of the quadrature-phase synchronous detection response above a prescribed frequency to generate phase shift circuitry response. Linear combining circuitry linearly combines the in-phase synchronous detection response and the phase shift circuitry response for recovering linear combining circuitry response to a portion of the video signal described both in the full sideband and the vestigial sideband of the vestigial sideband amplitude-modulation signal as originally received. This linear combining circuitry response is substantially free of response to any digital television signal that occupies the television broadcast channel being currently received. A threshold detector is included in the receiver for determining when the first linear combining circuitry response exceeds a prescribed threshold value, for generating indications that the co-channel analog television signal is of substantial amplitude.

DETAILED DESCRIPTION

Figure 1:
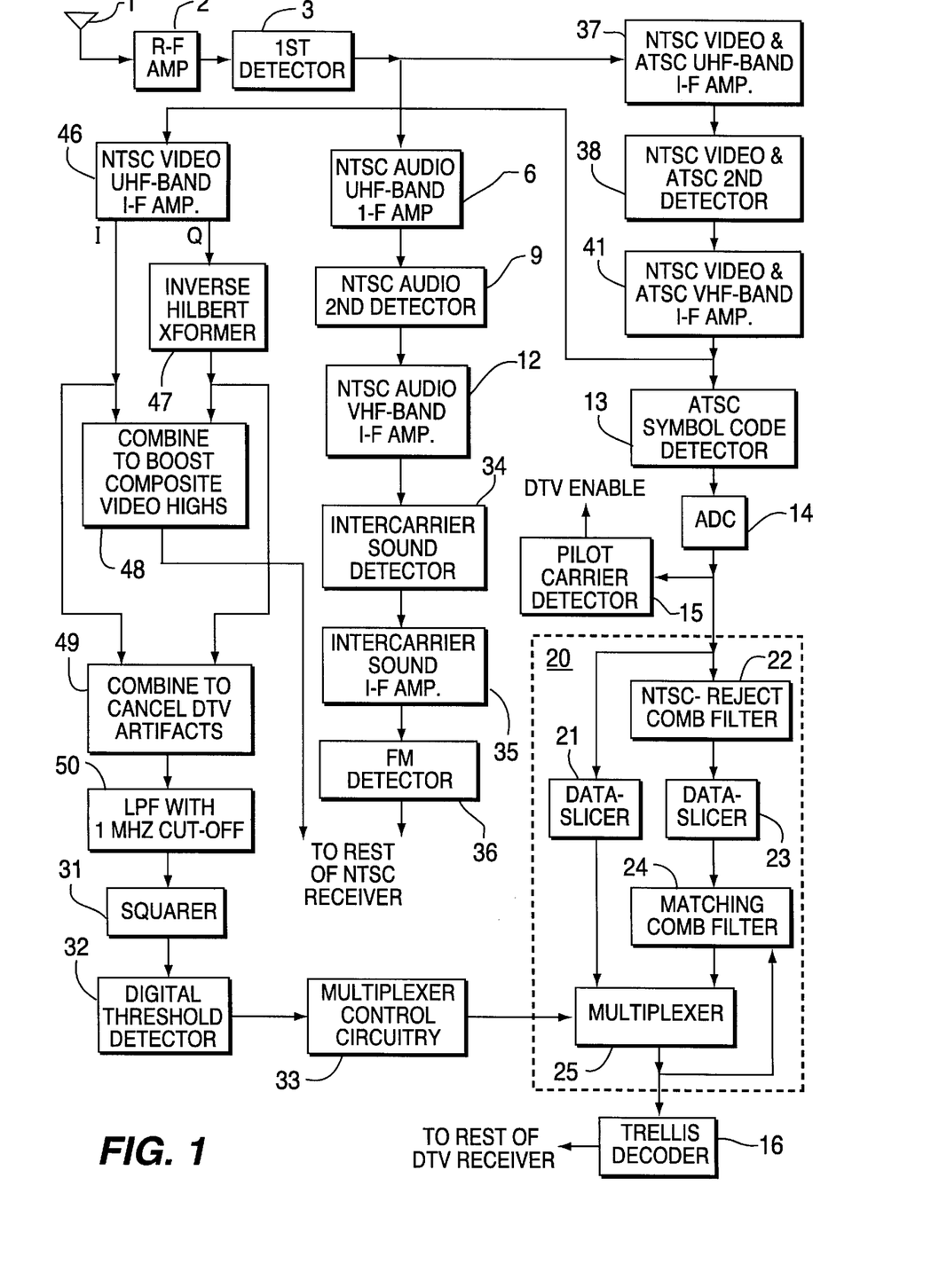
FIGS. 1 and 2 are each a schematic diagram of a television receiver that is capable of receiving NTSC analog TV signals as well as DTV signals, which receiver employs the method of the invention for detecting the presence in DTV signals of co-channel interfering NTSC analog TV signals.

FIG. 1 shows portions of a television receiver that is capable of receiving NTSC analog TV signals as well as DTV signals. Over-the-air type television broadcasting signals as received by an antenna 1 are amplified by an adjustably tuned radio-frequency amplifier 2 and supplied to a first detector 3. The RF amplifier 2 and the first detector 3 have adjustable tuning and together function as a tuner for selecting a digital television signal from one of channels at different locations in a frequency band. The first detector 3 includes a first local oscillator supplying first local oscillations tunable over a frequency range above the ultra-high-frequency (UHF) TV broadcast band and a first mixer for mixing the first local oscillations with a TV signal selected by the adjustably tuned RF amplifier 2 for upconverting the selected TV signal to generate a UHF intermediate-frequency signal in a 6-MHz-wide UHF intermediate-frequency band located at frequencies above the assigned channels in the UHF TV broadcast band.

The first detector 3 supplies the high-IF-band signal to a UHF-band intermediate-frequency amplifier 6 used in NTSC audio reception. The response of the UHF IF amplifier 6 is applied to a second detector 9 used in NTSC audio reception. The second detector 9 includes a second local oscillator supplying second local oscillations of prescribed frequency above the ultrahigh frequency UHF TV broadcast band and a second mixer for mixing the second local oscillations with the response of the UHF IF amplifier 6 to generate a very-high-frequency (VHF) intermediate frequency signal located at frequencies below the assigned channels in the VHF TV broadcast band. This VHF IF signal is supplied to a very-high-frequency intermediate-frequency amplifier 12.

The response of the VHF IF amplifier 12 is applied to an intercarrier sound detector 34, which supplies 4.5 MHz intercarrier sound intermediate-frequency signals to an intercarrier sound intermediate-frequency amplifier 35 which amplifies and in most designs symmetrically limits the amplified response for application to an FM detector 36. The FM detector 36 reproduces baseband composite audio signal supplied to the remaining portions of the analog TV receiver part of the DTV receiver. In regard to baseband composite audio signal, these remaining portions typically include stereophonic decoder circuitry. If the NTSC audio signals are selected with narrowband filtering in the IF amplifiers 6 and 12 that pass only the FM audio carrier as translated to intermediate frequencies, the intercarrier sound detector 34 can be provided by a multiplier that multiplies the IF amplifier 12 response by video carrier selected to the multiplier by a narrowband filter responsive to the response of the IF amplifier 10 or 11. If the NTSC audio signals are selected with filtering in the IF amplifiers 6 and 12 that passes both the NTSC video and audio carriers as translated to intermediate frequencies, for implementing "quasi-parallel" sound, the intercarrier sound detector 34 can be a simple rectifier or can be a square-law device.

The first detector 3 also supplies the high-IF-band signal to a UHF-band intermediate-frequency amplifier 37 used both in NTSC video reception and in ATSC reception. A surface-acoustic-wave (SAW) filter in the UHF IF amplifier 37, which determines overall IF response for ATSC DTV signal and for NTSC video signal, preferably rejects NTSC audio signal. Otherwise, the SAW filter has substantially flat amplitude response over the remainder of the 6-MHz-wide TV broadcast channel as translated to the UHF IF band and has substantially linear phase response throughout its passband. The SAW filter is preceded in the UHF IF amplifier 37 by a transistor amplifier designed to drive the SAW filter from a prescribed source impedance that minimizes multiple-reflection. Better to maintain this prescribed source impedance, the transistor amplifier gain is preferably fixed in value and suffices to overcome the insertion loss in the SAW filter. The response of the UHF IF amplifier 37 is applied to a second detector 38 used in ATSC DTV reception and in NTSC video reception. The second detector 38 includes a second local oscillator supplying second local oscillations of prescribed frequency above the ultrahigh frequency UHF TV broadcast band and a second mixer for mixing the second local oscillations with the response of the UHF IF amplifier 37 to generate a very-high-frequency (VHF) intermediate frequency signal located at frequencies below the assigned channels in the VHF TV broadcast band. The second detectors 9 and 38 preferably share the same second local oscillator.

The VHF IF signal from the second detector 38 is supplied to a very-high-frequency intermediate-frequency amplifier 41, which includes controlled-gain transistor amplifier stages that provide up to 60 dB or more amplification. The VHF IF amplifier 41 is provided with reverse automatic gain control derived in response to its output signal level, reverse AGC being preferred for the linearity of gain it affords. The RF amplifier 2 is provided with delayed reverse automatic gain control in response to the output signal level of the IF amplifier 47.

Output signal from the VHF IF amplifier 47 is applied to an ATSC symbol code detector 13, which detects baseband symbol codes therefrom. The symbol code detector 13 is one which uses an in-phase synchronous detector for detecting the vestigial-sideband amplitude-modulation of the data carrier and uses a quadrature-phase synchronous detector for developing automatic frequency and phase control (AFPC) signal for a controlled oscillator supplying synchrodyning signals to the synchronous detectors. The in-phase synchronous detector operates in the analog regime and its output signal is digitized with 10-bit or so resolution by an analog-to-digital converter 14. Alternatively, the symbol code detector 13 and succeeding ADC 14 can be replaced by a third detector for converting the VHF-band response of the IF amplifier 47 to a final intermediate-frequency band just above baseband, an analog-to-digital converter for digitizing the third detector response, and digital synchrodyning circuitry for synchrodyning the digitized third detector response to baseband. Such alternative circuitry is described by C. B. Patel et alii in U.S. Pat. No. 5,479,449, issued 26 Dec. 1995 and entitled "DIGITAL, VSB DETECTOR WITH BANDPASS PHASE TRACKER, AS FOR INCLUSION IN AN HDTV RECEIVER", and in U.S. Pat. No. 5,548,617, issued 20 Aug. 1995 and entitled "DIGITAL VSB DETECTOR WITH BANDPASS PHASE TRACKER USING RADER FILTERS, AS FOR USE IN AN HDTV RECEIVER", by way of examples. When a DTV signal is being received, a direct signal resulting from the synchronous detection of the pilot signal accompanies the symbol codes as reproduced at baseband and is detected by a pilot carrier detector 15 to generate a DTV ENABLE signal, which conditions the display portions of the DTV receiver to display DTV images rather than NTSC television images. The pilot carrier detector 15 can, as shown in FIG. 1, be of a type to respond to digital input signal or alternatively can be of a type to respond to analog input signal as supplied directly from the symbol code detector 13.

FIG. 1 shows the digitized baseband symbol codes being, supplied from the ADC 14 to a symbol decoder 20 of the type described in greater detail in U.S. patent application Ser. No. 08/746,520 filed by the inventor on 12 Nov. 1996 and entitled "DIGITAL TELEVISION RECEIVER WITH ADAPTIVE FILTER CIRCUITRY FOR SUPPRESSING NTSC CO-CHANNEL INTERFERENCE". The symbol decoder 20 comprises a data slicer 21 for data-slicing the symbol decoder 20 input signal to produce a first symbol decoder response, an NTSC-artifact-rejection comb filter 22 supplying a response to the symbol decoder 20 input signal which response suppresses any NTSC co-channel interfering signal, a data slicer 23 for data-slicing the comb filter 22 response for generating an erroneous symbol decoder response, a matching comb filter 24 for correcting that erroneous symbol decoder response to produce a second symbol decoder response, and a multiplexer 25 for selecting one of the first and second symbol decoder responses as the ultimate symbol decoder response supplied by the symbol decoder 20 to a trellis decoder 16 typical to a DTV receiver. In the absence of an indication of substantial NTSC co-channel interfering signal being received, the multiplexer 25 selects the first symbol decoder response from the data slicer 21 to provide the symbol decoder 20 output signal to the trellis decoder 16. In the presence of the indication of substantial NTSC co-channel interfering signal being received, except during symbol decoder initialization intervals, the multiplexer 25 selects the second symbol decoder response from the matching comb filter 24 to provide the symbol decoder 20 output signal to the trellis decoder 16.

The symbol decoder 20 can be improved by modifying the multiplexer 25 to supply ideal symbol decoding results drawn from memory within the television receiver at times data segment synchronization and field synchronization code groups appear in a received DTV signal. Such improvement is described in detail in U.S. patent application Ser. No. 08/839,691 filed by the inventor on 15 Apr. 1997 and entitled "DIGITAL TELEVISION RECEIVER WITH ADAPTIVE FILTER CIRCUITRY FOR SUPPRESSING NTSC CO-CHANNEL INTERFERENCE".

Output signal from the VHF IF amplifier 47 is applied to circuitry 46 for synchrodyning NTSC video carrier modulation to baseband. Both an in-phase synchronous detector and a quadrature-phase synchronous detector are used in the circuitry 46 for synchrodyning NTSC video carrier modulation to baseband; synchrodyning is presumed to be carried out in the digital regime after converting to a final intermediate-frequency band just above baseband, so the final intermediate-frequency can be digitized. Alternatively, synchrodyning NTSC video carrier modulation to baseband can be done in the analog regime, and the responses of an in-phase synchronous detector and a quadrature-phase synchronous detector used for this purpose can be digitized using respective analog-to-digital converters. The response Q of the quadrature-phase synchronous detector is the Hilbert transform of the single sideband components of the NTSC signal (i. e., those components above 750 kHz in frequency) plus the artifacts of the DTV signal as they appear in the response I of the in-phase synchronous detector. This Hilbert transform provided by the response Q of the quadrature-phase synchronous detector is phase shifted to provide 90° lag at all frequencies (except possibly the lowest at which there should be little response) by inverse Hilbert transform circuitry 47.

Addition and subtraction are considered as being alternative forms of linearly combining. One of linear combiners 47 and 48 is an adder and the other is a subtractor. The inverse Hilbert transform response of the circuitry 47 is linearly combined with the response of the in-phase synchronous detector in the linear combiner 48 to generate a composite video signal with high frequencies boosted to correct levels for application to the rest of the analog TV receiver circuitry. In regard to baseband composite video signal, these remaining portions typically include sync separation circuitry, color signal reproduction circuitry, and circuitry for adapting the 4:3 aspect ratio NTSC image for presentation on a 16:9 viewscreen used for displaying DTV images.

The inverse Hilbert transform response of the circuitry 47 is linearly combined in the linear combiner 49 with the in-phase baseband response I of the synchrodyne circuitry 46 to generate a luminance signal cutting off somewhat above 750 kHz, which luminance signal is free of DTV artifacts. Whether the linear combiners 48 and 49 are respectively an adder and a subtractor, or whether the linear combiners 48 and 49 are respectively a subtractor and an adder depends on the whether the operation of the quadrature-phase synchronous detector is chosen to lead the operation of the in-phase synchronous detector or to lag it.

FIG. 1 shows the band-limited luminance signal from the linear combiner 49 being further filtered using a lowpass filter 50 with a cut-off frequency of 1 MHz or so and then being squared by a squarer 31 for generating an indication of the energy of NTSC co-channel interfering signal during DTV reception. The squarer 31 could be constructed from a digital multiplier receiving that signal both as multiplier and as multiplicand, but is more practical to realize in read-only memory. The squarer 31 output signal is an indication of the energy of NTSC co-channel interfering signal during DTV reception.

A digital threshold detector 32 determines when this indication is strong enough to exceed a threshold value below which NTSC co-channel interfering signal is considered not to be substantial enough to be likely to introduce uncorrectable error into the operation of the data slicer 21. The threshold detector 32 response is supplied to multiplexer control circuitry 33. The multiplexer control circuitry 33 controls the selection by the multiplexer 25 between first and second symbol decoder responses that determines the ultimate symbol decoder response supplied as the symbol decoder 20 output signal. The multiplexer control circuitry 33 conditions the multiplexer 25 to select the first symbol decoder response as the symbol decoder 20 output signal during symbol decoder initialization intervals. At other times the multiplexer control circuitry 33 conditions the multiplexer 25 to select the first symbol decoder response as the symbol decoder 20 output signal as long as the threshold detector 32 response indicates that NTSC co-channel interfering signal is considered not to be substantial enough to be likely to introduce uncorrectable error into the operation of the data slicer 21, otherwise conditioning the multiplexer 25 to select the second symbol decoder response as the symbol decoder 20 output signal.

Figure 2:
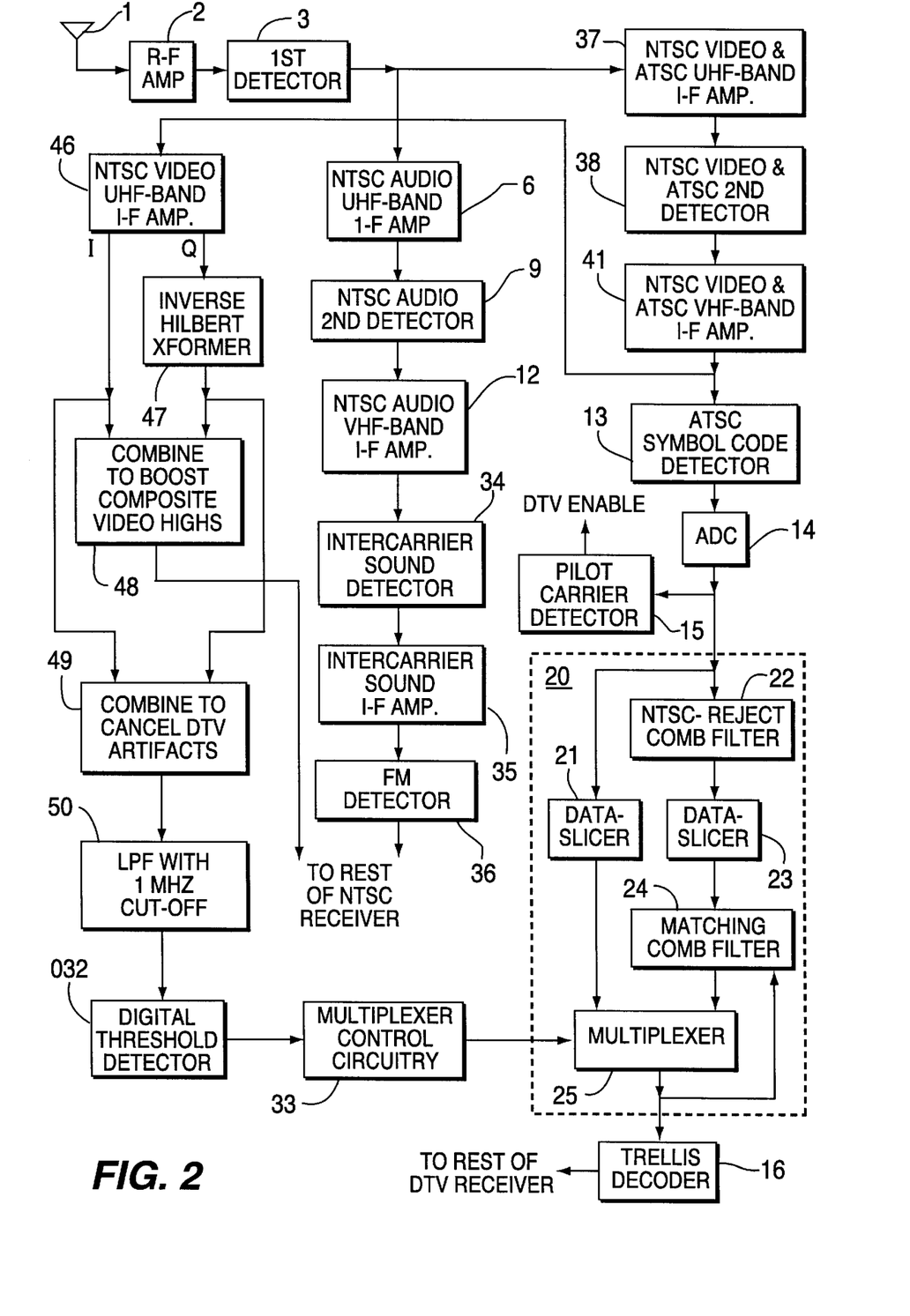

FIG. 2 shows the FIG. 1 apparatus modified for supplying the response of the linear combiner 49 to the digital threshold detector 32 without squaring by the squarer 31. The response of the linear combiner 49 is essentially baseband luminance extending up to 750 kHz, so is always of the same polarity. Accordingly, the squarer 31 can be dispensed with, and the digital threshold detector 32 can be replaced with a digital threshold detector 032 with a prescribed threshold that is the square root of the prescribed threshold of the digital threshold detector 32. That is, the prescribed threshold of the digital threshold detector 32 is the square of the prescribed threshold of the digital threshold detector 032.

In the FIG. 1 and FIG. 2 television receivers the inclusion of the lowpass filter 50 eases the requirements on the inverse Hilbert transform circuitry 47, since exact 90° lag need not be provided at frequencies above the cut-off frequency of the lowpass filter 50 in order to suppress DTV artifacts in that portion of the frequency spectrum. Where the inverse Hilbert transform circuitry 47 provides reasonably exact 90° lag up to 4.2 MHz or so, it is possible to replace the lowpass filter 50 by a straight-through connection. Insofar as the combining of the inverse Hilbert transform filter 47 response in linear combiner 48 with the in-phase baseband response I of the synchrodyne circuitry 46 to boost composite video signal high frequencies is concerned, the inverse Hilbert transform circuitry 47 need not provide exact 90° lag for frequencies clear up to 4.2 MHz, since video peaking circuitry can be employed to compensate for the roll-off of composite video signal high frequencies that attends incorrect lag if the error in lag is not too severe.

Figure 3:
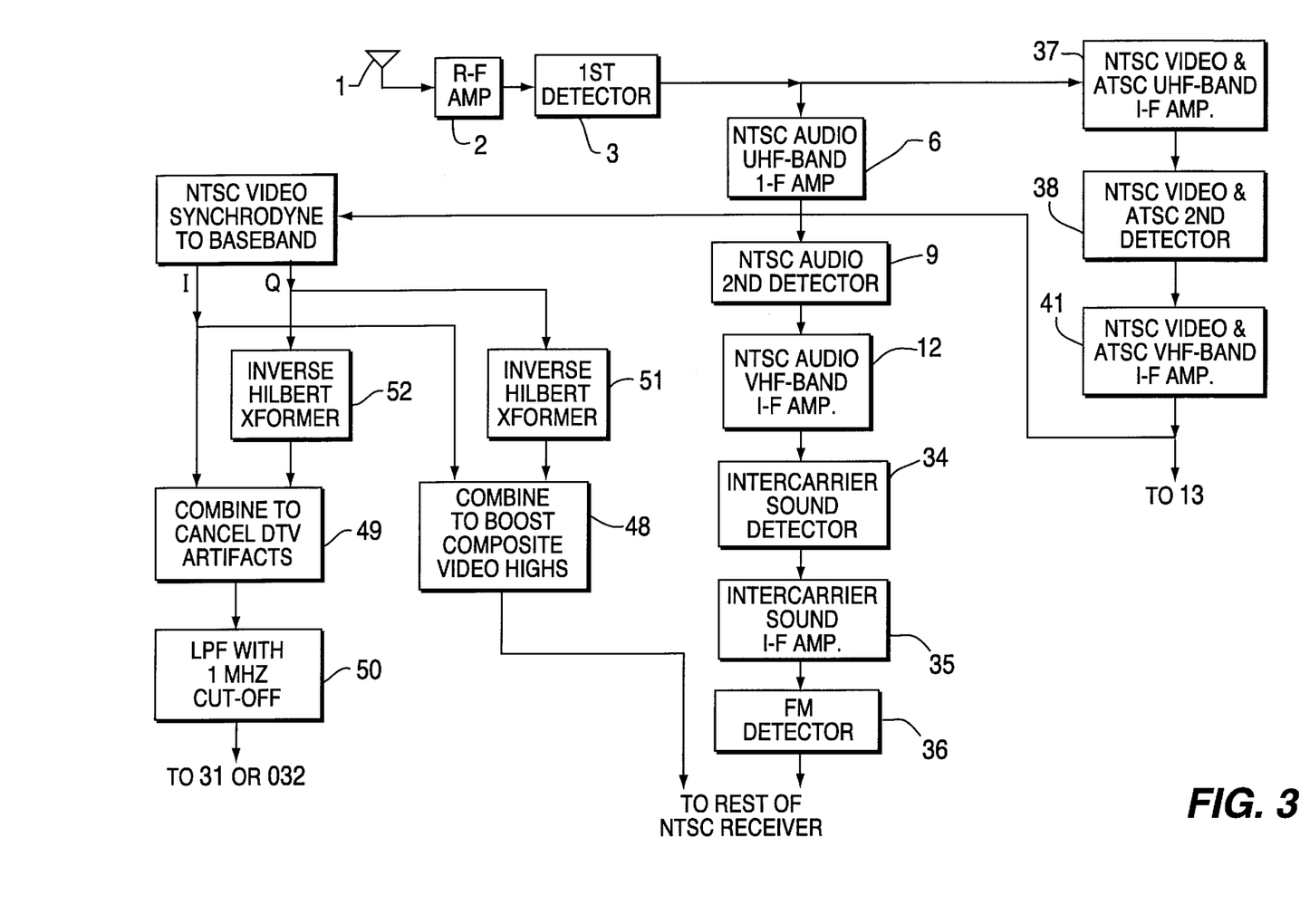
FIG. 3 is a schematic diagram of a modification that can be made to either of the television receivers of FIGS. 1 and 2.

FIG. 3 shows a modification that can be made to either of the television receivers of FIGS. 1 and 2. In the FIG. 3 modification, instead of the inverse Hilbert transform circuitry 47 shifting the quadrature-phase baseband response Q of the synchrodyne circuitry 46 for application to both the linear combiners 48 and 49, inverse Hilbert transform circuitry 51 shifts the quadrature-phase baseband response Q of the synchrodyne circuitry 46 for application just to the linear combiner 48; and other inverse Hilbert transform circuitry 52 shifts the quadrature-phase baseband response Q of the synchrodyne circuitry 46 for application just to the linear combiner 49. The inverse Hilbert transform circuitry 51 provides reasonably exact 90° lag from 0.5 MHz to 4.2 MHz to optimize the spectral response of the composite video signal, but does not have to provide 90° lag at frequencies well below 0.5 MHz. This avoids the many, many tap finite-impulse-response (FIR) filter needed for providing 90° lag at frequencies well below 0.5 MHz at the high digital sampling rates necessary also to provide 90° lag at frequencies up to 4.2 MHz. Owing to the use of the lowpass filter 50, the inverse Hilbert transform circuitry 52 need provide reasonably exact 90° lag only up to 1.0 MHz or so, but circuitry 52 provides 90° lag at frequencies well below 0.5 MHz, preferably down to a fraction of NTSC scan line rate. These requirements can be met at a decimated digital sampling rate, four times lower than the digital sampling rate used in the inverse Hilbert transform circuitry 51, substantially reducing the temporary storage requirements to provide differentially delayed samples for the FIR filtering in the inverse Hilbert transform circuitry 52. Indeed, the lowpass filter 50 can be designed to have a still lower cut-off frequency below 0.5 MHz, so the decimated digital sampling rate used in the inverse Hilbert transform circuitry 52 can be eight times lower than the digital sampling rate used in the inverse Hilbert transform circuitry 51. Or the cut-off frequency of the lowpass filter 50 can be further halved another time or few times, so the decimated digital sampling rate used in the inverse Hilbert transform circuitry 52 can be further decimated from the digital sampling rate used in the inverse Hilbert transform circuitry 51.

Figure 4:
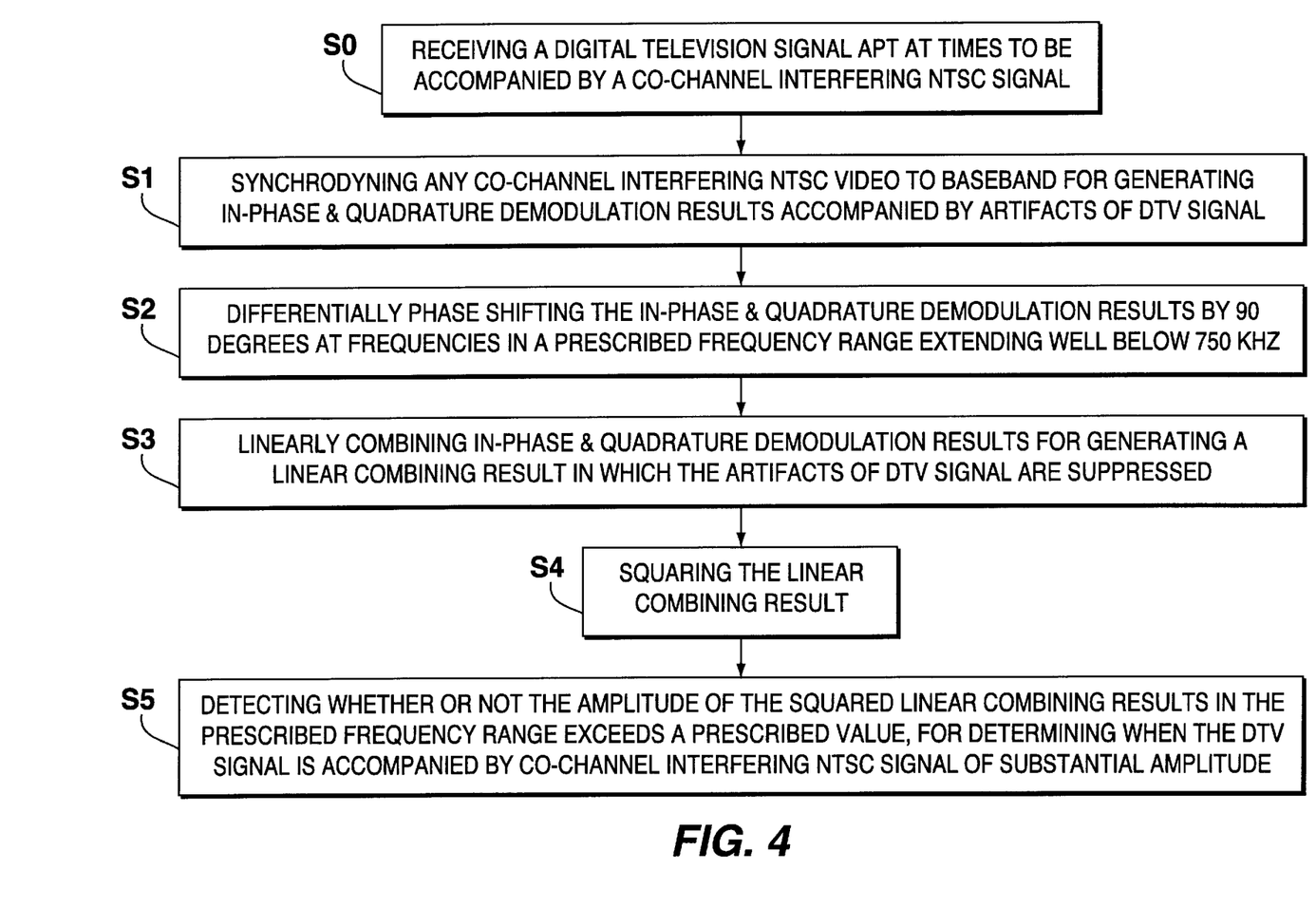
FIGS. 4, 5, 6 and 7 are flow charts showing steps of the methods for detecting in a digital television receiver when a digital television signal is accompanied by co-channel interfering NTSC signal of substantial amplitude, which methods embody the invention in its various aspects.

FIG. 4 is a flow chart of the method of operation implemented by the FIG. 1 TV receiver. An initial step SO of receiving a digital television signal apt at times to be accompanied by a co-channel interfering analog television signal having a video portion is carried out by elements 1, 2, 3, 37, 38, and 41 of the FIG. 1 TV receiver. The synchrodyne circuitry 46 carries out a subsequent step S1 of synchrodyning the video portion of any co-channel interfering analog television signal to baseband, for generating an in-phase demodulation result including first artifacts of the DTV signal, and for generating a quadrature-phase demodulation result including second artifacts of the DTV signal. The inverse Hilbert transformer circuitry 47 implements a subsequent step S2 of differentially shifting the in-phase and quadrature-phase demodulation results in respective phase by 90° at frequencies in a prescribed frequency range extending well below 750 kilohertz. The linear combiner 49 carries out a subsequent step S3 of linearly combining the in-phase and quadrature-phase demodulation results following their differential shifting in respective phase by 90° at frequencies in the prescribed frequency range, to generate a linear combining result substantially free of the first and second artifacts of the digital television signal in the prescribed frequency range. (The cut-off of the lowpass filter 50 determines the upper boundary of this prescribed frequency range.) The squarer 31 performs a step S4 of squaring the linear combining result; and the digital threshold detector 32 then carries out a final step S5 of detecting whether or not the resulting square of said linear combining result exceeds the square of said prescribed value, for determining whether the digital television signal is accompanied by co-channel interfering analog television signal of substantial amplitude.

Figure 5:
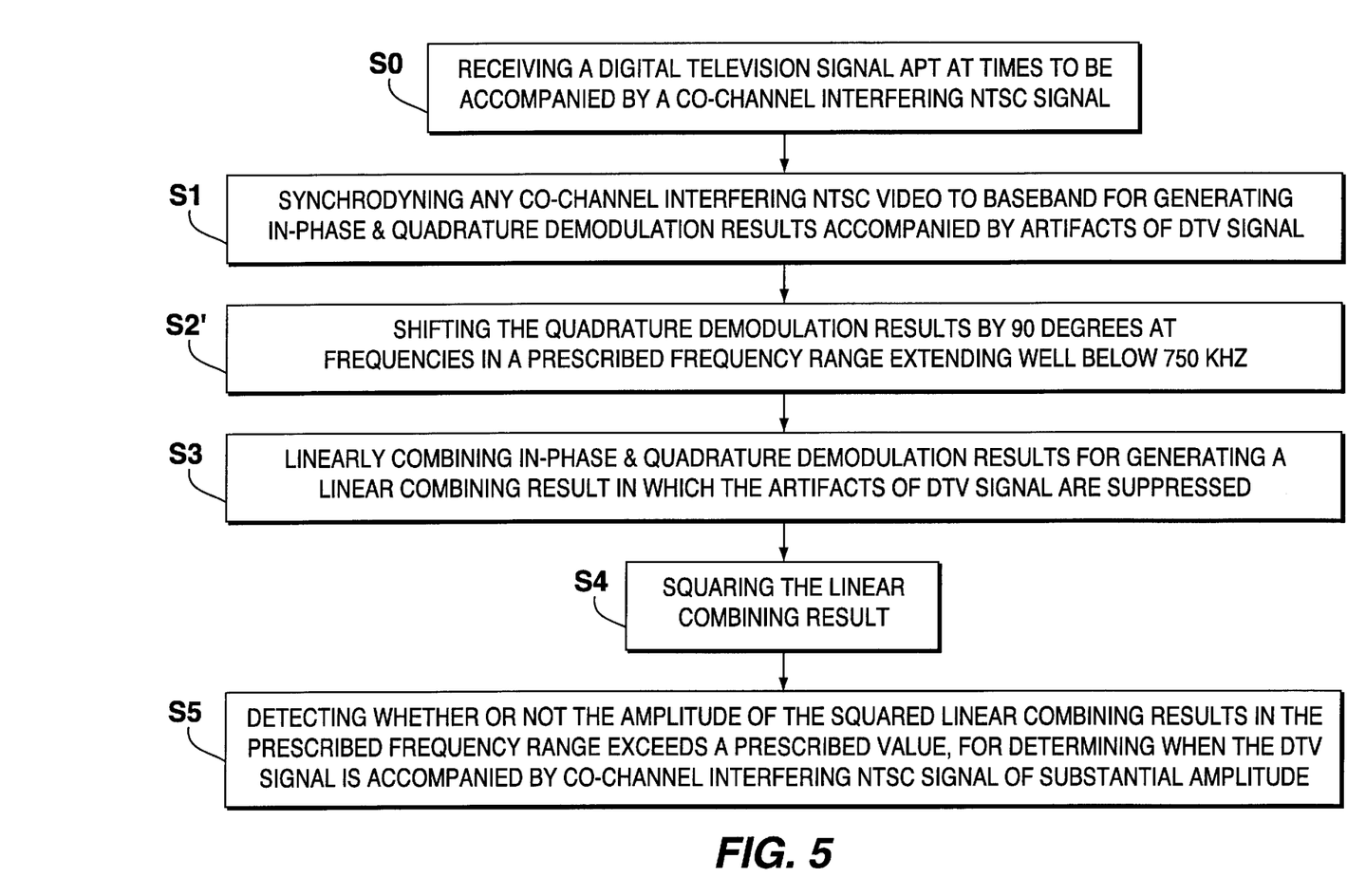

FIG. 5 is a flow chart of the method of operation implemented by the FIG. 1 TV receiver, differing from the FIG.

4 flow chart in that the step S2 implemented by the inverse Hilbert transformer circuitry 47 is more particularly shown as the step S2' of phase shifting the quadrature-phase demodulation results by 90° at frequencies in a prescribed frequency range extending well below 750 kilohertz.

Figure 6:
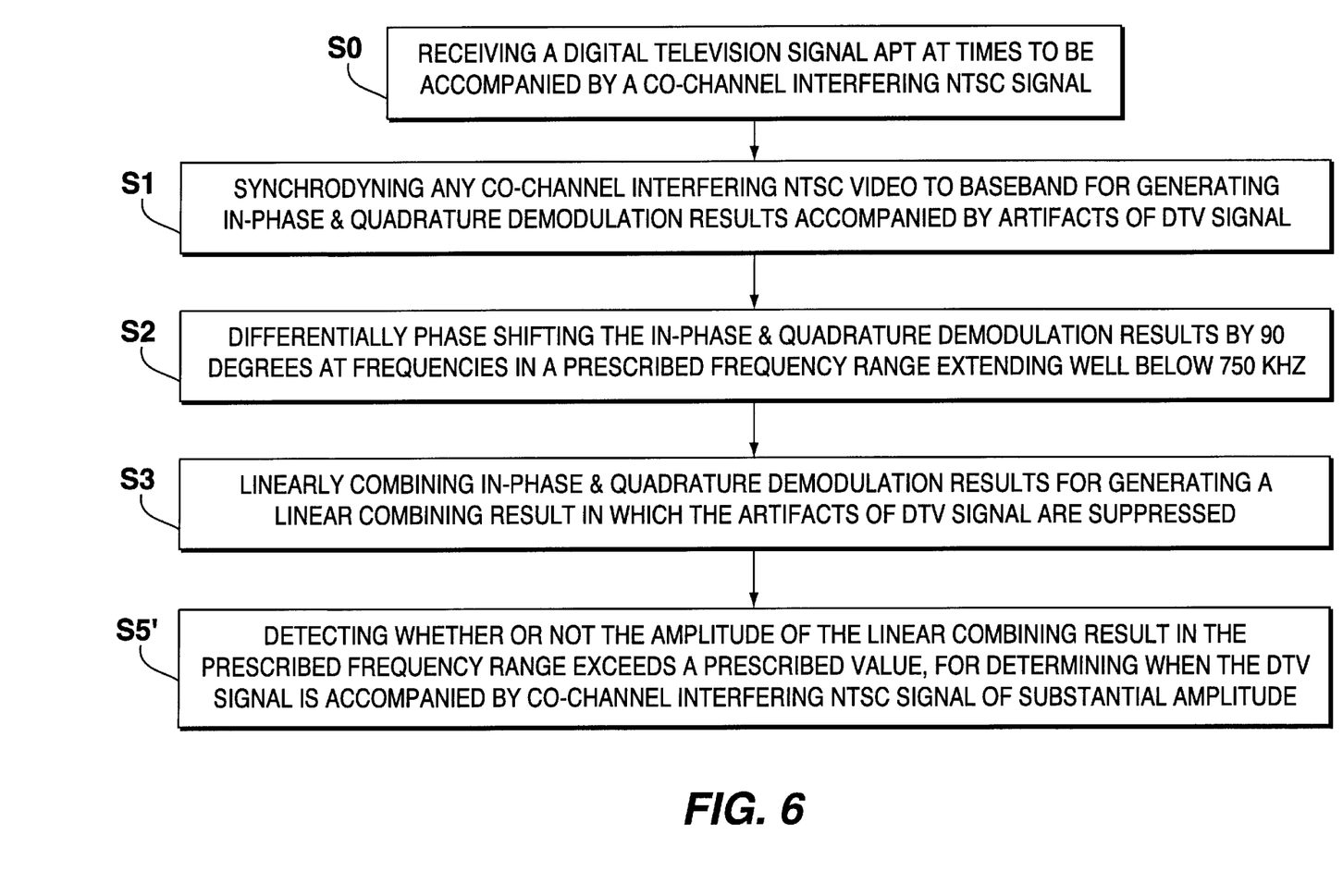

FIG. 6 is a flow chart of the method of operation implemented by the FIG. 2 TV receiver. The method depicted in the FIG. 6 flow chart uses the same steps S0, S1, S2 and S3 depicted in the FIG. 4 flow chart. The step S4 of squaring implemented by the squarer 31 in the FIG. 1 TV receiver is omitted in the operation of the FIG. 2 TV receiver, of course. The step S5 performed by the digital threshold detector 32 in the FIG. 1 TV receiver is supplanted in the operation of the FIG. 2 TV receiver by a step S5' of detecting whether or not the amplitude of the linear combining result in the prescribed frequency range exceeds a prescribed value, for generating an indication of when the DTV signal is accompanied by co-channel interfering analog television signal of substantial amplitude. This step S5' is carried out by the digital threshold detector 032 in the FIG. 2 TV receiver.

Figure 7:
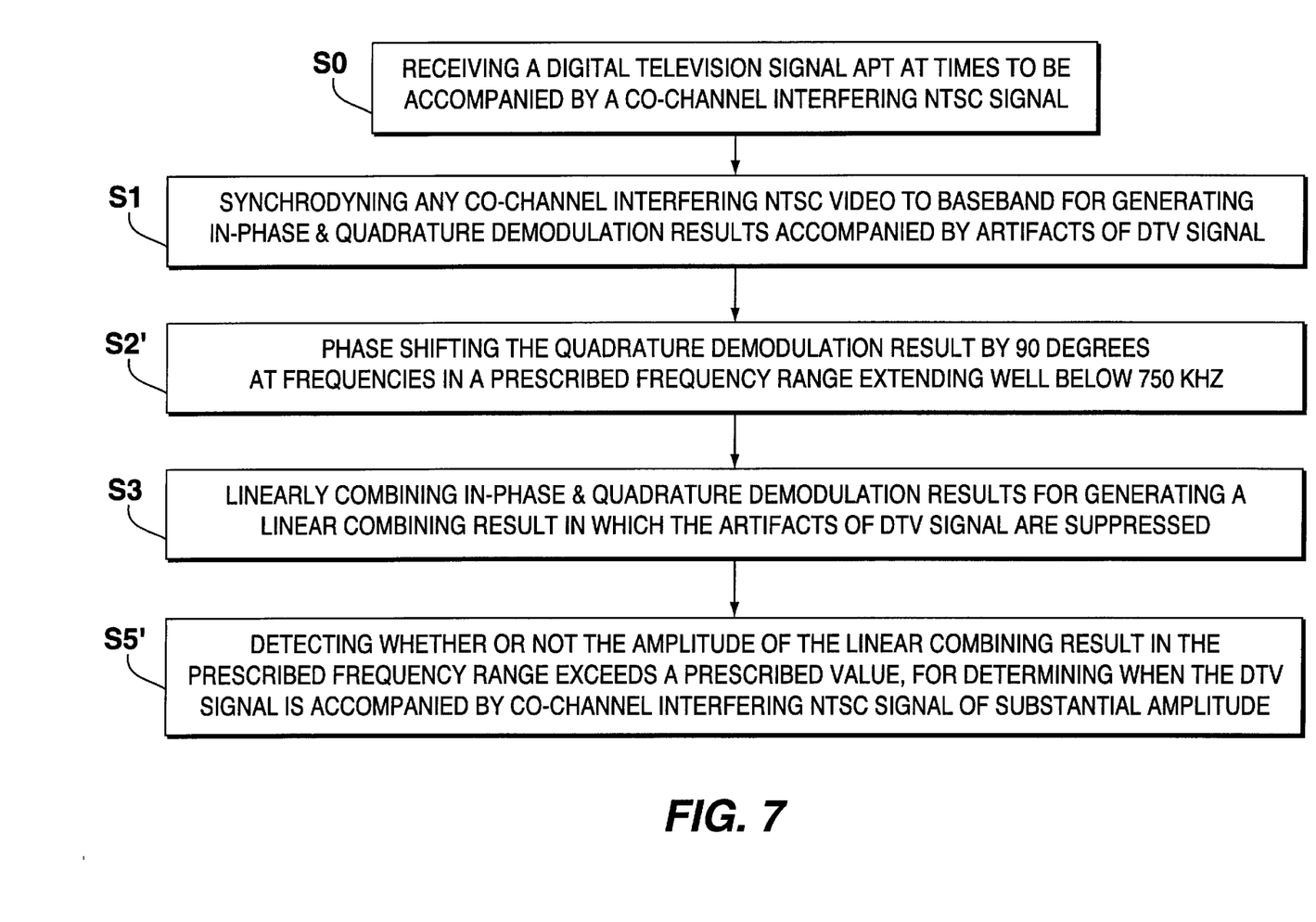

FIG. 7 is a flow chart of the method of operation implemented by the FIG. 6 TV receiver, differing from the FIG. 4 flow chart in that the step S2 implemented by the inverse Hilbert transformer circuitry 47 is more particularly shown as the step S2' of phase shifting the quadrature-phase demodulation results by 90° at frequencies in a prescribed frequency range extending well below 750 kilohertz.

What is claimed is:

1. A method comprising the steps of:

receiving a digital television signal apt at times to be accompanied by a co-channel interfering analog television signal having a video portion;

synchrodyning the video portion of any said co-channel interfering analog television signal to baseband, for generating an in-phase demodulation result including first artifacts of said digital television signal, and for generating a quadrature-phase demodulation result including second artifacts of said digital television signal;

differentially shifting said in-phase and quadrature-phase demodulation results in respective phase by 90° at frequencies in a prescribed frequency range extending below 750 kilohertz;

linearly combining said in-phase and quadrature-phase demodulation results following said differential shifting in respective phase by 90° at frequencies in said prescribed frequency range, to generate a linear combining result substantially free of the first and second artifacts of the digital television signal in said prescribed frequency range; and detecting whether or not the amplitude of said linear combining result in said prescribed frequency range exceeds a prescribed value, for generating an indication of when said digital television signal is accompanied by co-channel interfering analog television signal of substantial amplitude.

2. The method of claim 1, wherein said step of differentially shifting said in-phase and quadrature-phase demodulation results in respective phase by 90° at frequencies in said prescribed frequency range comprises a substep of:

inverse Hilbert transforming said quadrature-phase demodulation result.

3. The method of claim 1, wherein said step of detecting whether or not the absolute amplitude of said linear combining result exceeds said prescribed value comprises substeps of:

squaring said linear combining result; and detecting whether or not the resulting square of said linear combining result exceeds the square of said prescribed value.

4. A method comprising the steps of:

receiving a digital television signal apt at times to be accompanied by a co-channel interfering analog television signal having a video portion;

synchrodyning the video portion of any said co-channel interfering analog television signal to baseband, for generating an in-phase demodulation result including first artifacts of said digital television signal, and for generating a quadrature-phase demodulation result including second artifacts of said digital television signal;

phase shifting said quadrature-phase demodulation results by 90° at frequencies in a prescribed frequency range extending below 750 kilohertz;

linearly combining the resulting phase-shifted quadrature-phase demodulation results with said in-phase quadrature-phase demodulation results, to generate a linear combining result substantially free of said first and second artifacts of said digital television signal in said prescribed frequency range; and detecting the amplitude of said linear combining result in said prescribed frequency range exceeding a prescribed value, for generating an indication that said digital television signal is accompanied by co-channel interfering analog television signal of substantial amplitude.

5. The method of claim 4, wherein said step of detecting the amplitude of said linear combining result in said prescribed frequency range exceeding a prescribed value for generating an indication that said digital television signal is accompanied by co-channel interfering analog television signal of substantial amplitude comprises substeps of:

squaring said linear combining result; and detecting when the resulting square of said linear combining result exceeds the square of said prescribed value for generating said indication that said digital television signal is accompanied by co-channel interfering NTSC signal of substantial amplitude.

6. A digital television receiver including circuitry for detecting times when analog television signal of substantial amplitude occupies a television broadcast channel, which circuitry comprises:

input circuitry for selecting from a television broadcast channel a vestigial sideband amplitude-modulation signal descriptive of a video signal portion of any analog television signal that occupies said television broadcast channel, converting the selected vestigial sideband amplitude-modulation signal to an intermediate frequency signal, and amplifying said intermediate frequency signal to provide an amplified intermediate frequency signal, said vestigial sideband amplitude-modulation signal as originally received by said input circuitry including a video carrier and full sideband in addition to a vestigial sideband;

video synchrodyning circuitry for synchronously detecting said amplified intermediate frequency signal with respect to said video carrier signal and with respect to a carrier in quadrature phase with said video carrier signal, for generating an in-phase synchronous detection response and for generating a quadrature-phase synchronous detection response;

first phase shift circuitry for phase shifting by substantially 90° all frequency components of said quadrature-phase synchronous detection response above a prescribed frequency to generate a first phase shift circuitry response;

first linear combining circuitry linearly combining said in-phase synchronous detection response and said first phase shift circuitry response for recovering first linear combining circuitry response to a portion of said video signal described both in said full sideband and said vestigial sideband, which first linear combining circuitry response is substantially free of response to any digital television signal that occupies said television broadcast channel; and a threshold detector for determining when said first linear combining circuitry response exceeds a prescribed threshold value, for generating indications that co-channel analog television signal is of substantial amplitude.

7. The digital television receiver of claim 6 further comprising:

second linear combining circuitry linearly combining said in-phase synchronous detection response and said first phase shift circuitry response for recovering second linear combining circuitry response to all of said video signal.

8. The digital television receiver of claim 6 further comprising:

second phase shift circuitry for phase shifting by substantially 90° frequency components of said quadrature-phase synchronous detection response above 500 kilohertz to generate a second phase shift circuitry response; and second linear combining circuitry linearly combining said in-phase synchronous detection response and said second phase shift circuitry response for recovering second linear combining circuitry response to all of said video signal.

* * * * *